(No Model.)
G. MAYER.
COMBINED FIREPLACE AND COOKING RANGE FOR CHEESE MAKING, &c.
No. 496,524. Patented May 2, 1893.
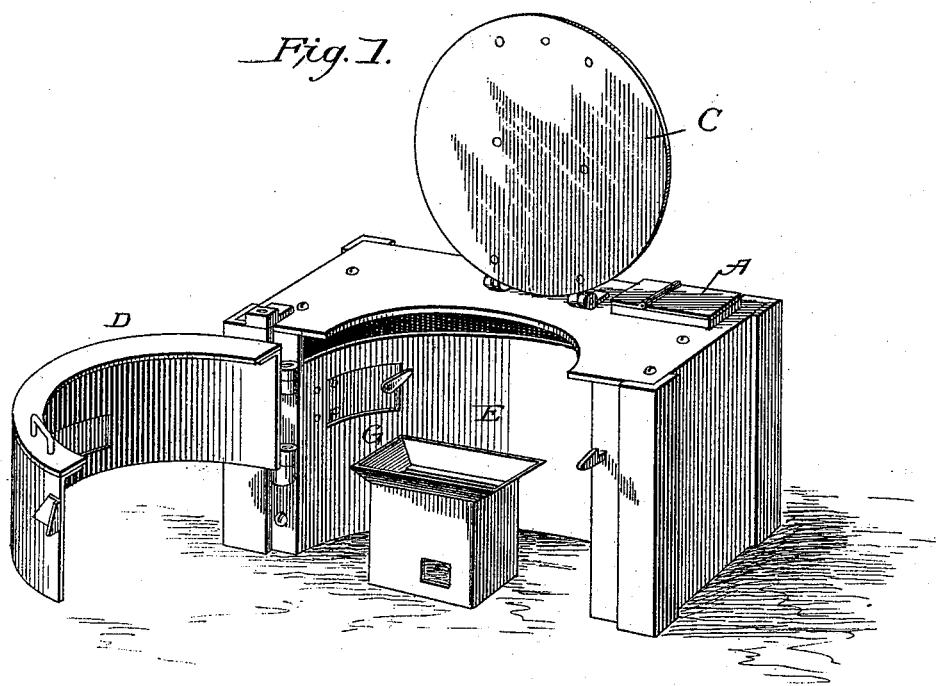
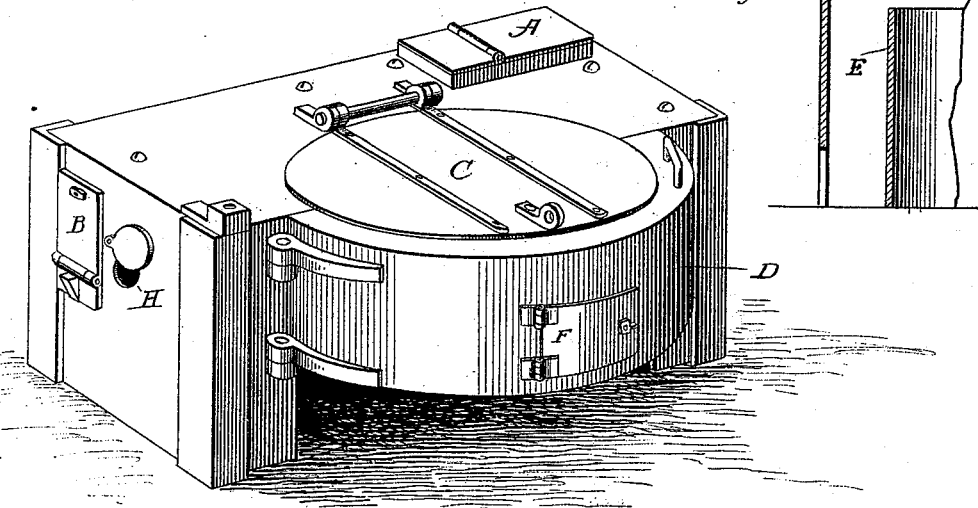
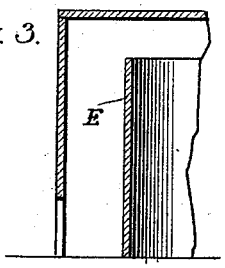
Witnesses:
Jno Leuchsinger
H. G. White
Inventor:
Gottfried Mayer

UNITED STATES PATENT OFFICE.

GOTTFRIED MAŸER, OF BELLEVILLE, WISCONSIN.

COMBINED FIREPLACE AND COOKING-RANGE FOR CHEESE-MAKING, &c.

SPECIFICATION forming part of Letters Patent No. 496,524, dated May 2, 1893.

Application filed January 25, 1892. Serial No. 419,253. (No model.)

*To all whom it may concern:*

Be it known that I, GOTTFRIED MAŸER, a citizen of the United States, residing at Belleville, in the county of Dane and State of Wisconsin, have invented a new and useful Fireplace and Cooking-Range Combined, designed and contrived especially for use in the manufacture of Swiss cheese and for any purpose generally wherein the use of a large kettle is necessary and wherein such kettle is to be shifted on and off the fire as the process of manufacture may require, of which the following is a specification.

In the manufacture of Swiss cheese a copper kettle of a capacity of one thousand to three thousand pounds of milk is required. In the process of making cheese this kettle is swung by means of a crane on and off the fireplace, as the different stages of making require.

Fireplaces consisting of a semi circular wall of masonry built to conform to the shape and size of the kettle, and not patented, have been in use for ages in such cheese factories and are now generally used. They are objectionable for the following reasons: Being of masonry they cannot be removed. They contain no conveniences for cooking or heating water. They are open in front and on top, thereby rendering operations difficult and unhealthy because of the escape of heat and smoke into the room when the kettle is off the fire. They are dangerous because of the liability of sparks and coals setting fire to the floors, and the milk and cheese are liable to become defiled by escaping ashes and soot.

The objects of my invention are, first, a fireplace for Swiss cheese making made entirely of metal plates and parts convenient in size and which may be set up and taken apart by means of bolts and nuts; second, to afford in the construction and material a fireplace that causes no discomfort from heat or smoke to the operatives, no danger from fire or sparks, and no filth or ashes to defile the premises; third, to provide facilities for cooking the food for operatives, and for the heating of water for cleansing purposes all without additional fuel. I attain these objects by the mechanism and arrangement illustrated in the accompanying drawings.

Figure 1 is a view of the entire fireplace and cooking range with the fire lid C lifted up and the front door open, in readiness to receive the kettle to be swung into the circular vacant space. Fig. 2 is a view of the entire fireplace when closed the circular lid C. being let down to confine the smoke and heat. When the kettle is in the fireplace it occupies the same space as the lid in this view. Fig. 3 is a sectional view of the rear and inner fire walls through the smoke outlet opening.

A is the top and lids of my water heater which I make of tin or copper and is adjusted so as to occupy part of the space between the inner and outer fire walls in the course of the heat flue beneath the said lids.

B is the door to the cooking and baking oven, which door is adjusted to rest horizontally when open. Said oven is made of thin metal and extends into the space between the inner and outer fire walls.

C is a circular lid of metal with which I cover the fireplace when not occupied by a kettle. I attach said lid to the rear part of the top plate by a hinge and attach a cord or wire to the front part of said lid and carry the same over a pulley attached to the ceiling and attach sufficient weight to nearly balance the weight of the lid thereby enabling the lid to be easily lowered or raised.

E, is the inside firewall along which the draft is upward into the space between the inner and outer walls, as shown by dark lines in the drawings Fig. 1, thence downward in said space into the pipe or chimney at the foot of the rear wall.

G, is an aperture in the inner firewall through which when open heat from the fire is admitted direct to the cooking oven. It is opened and closed by means of a door which is reached and operated through the circular hole H as shown in Fig. 2 of the drawings.

The whole device constitutes a new, convenient, cleanly, economical and removable fireplace and cooking range combined, especially designed to be used in the peculiar processes of making Swiss cheese.

Having thus described my invention, I claim as new and desire to secure by Letters Patent—

1. A cheese fireplace consisting of a main or body portion, and a hinged front portion, each having therein a portion of the pot hole of said fireplace.

2. A cheese fireplace consisting of a main or body portion, and a hinged front portion, each having therein a portion of the pot hole, said fire place having a flue in the rear of its body portion, an oven in said flue, and a damper in the wall of said flue which is adjacent to the fire box of the apparatus.

GOTTFRIED MAYER.

Witnesses:
ALBERT M. GREEN,
HENRY BABLER.